F. SALOMON.
METHOD OF BLANCHING PEANUTS.
APPLICATION FILED SEPT. 15, 1915.
1,206,258.
Patented Nov. 28, 1916.
2 SHEETS—SHEET 2.
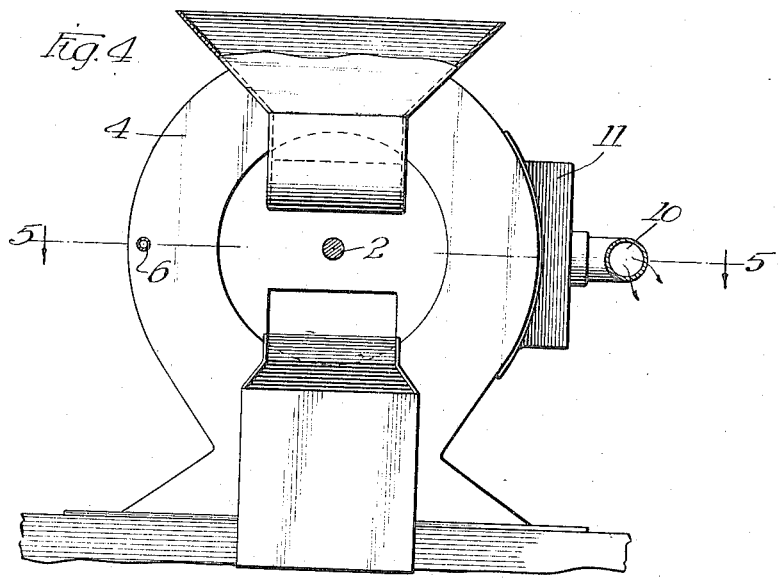
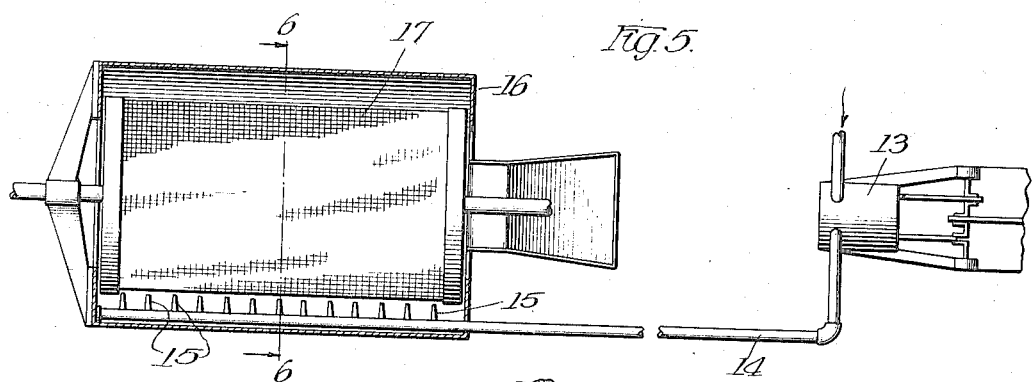
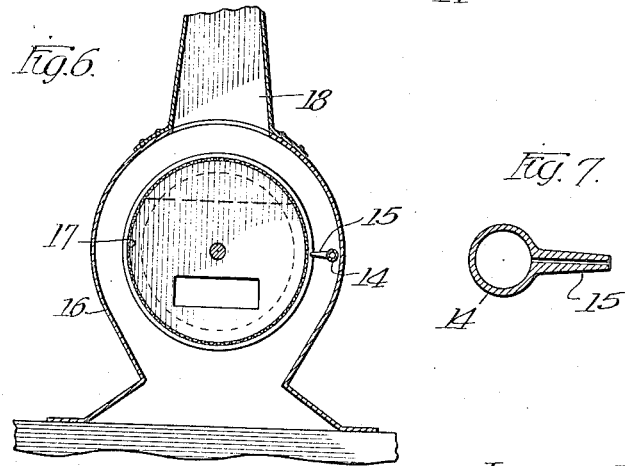
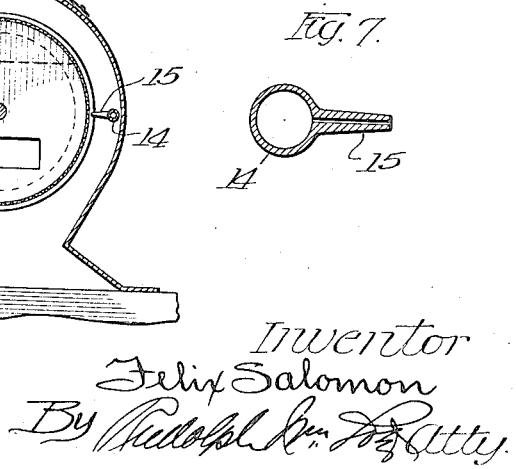

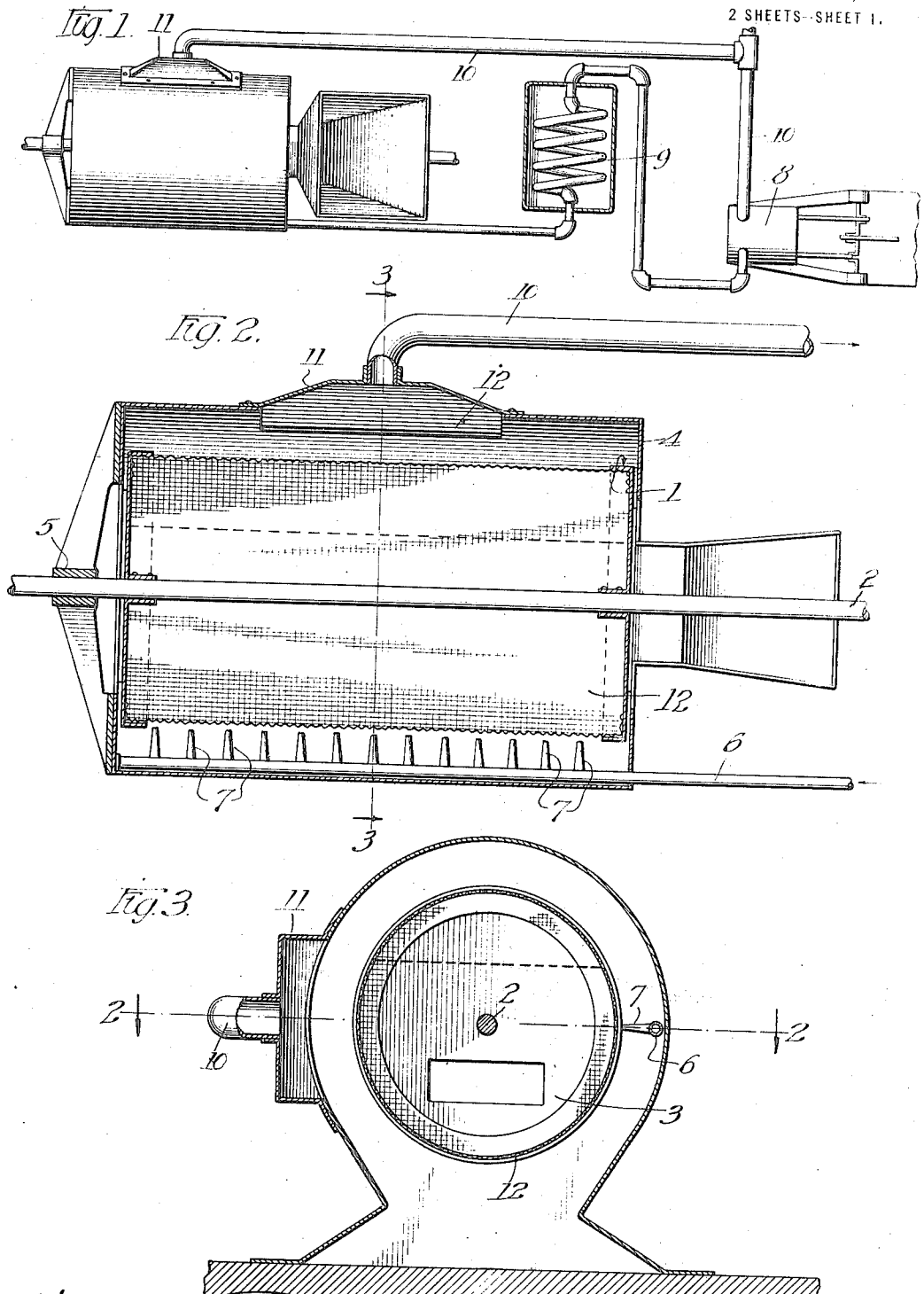

UNITED STATES PATENT OFFICE.

FELIX SALOMON, OF CHICAGO, ILLINOIS, ASSIGNOR TO UNITED FIG & DATE COMPANY, OF CHICAGO, ILLINOIS, A COPARTNERSHIP.

METHOD OF BLANCHING PEANUTS.

1,206,258.  Specification of Letters Patent.  Patented Nov. 28, 1916.

Application filed September 15, 1915. Serial No. 50,846.

*To all whom it may concern:*

Be it known that I, FELIX SALOMON, citizen of the United States, residing at Chicago, in the county of Cook and State of Illinois, have invented certain new and useful Improvements in Methods of Blanching Peanuts; and I do hereby declare the following to be a full, clear, and exact description of the invention, such as will enable others skilled in the art to which it appertains to make and use the same.

This invention has for its object to provide a novel method for blanching peanuts either in the raw or roasted state, and consists in the novel steps hereinafter fully described and particularly claimed.

The main object of the present invention is to provide a method of blanching peanuts which will involve no hand labor and will not subject the peanuts being blanched to excessive friction or agitation and which will, therefore, preserve the kernels in the best possible condition, and also to provide a method which will be very cheap and efficient.

A further object of the invention is to provide a method for simultaneously blanching and otherwise treating the kernels to either roast the same during the blanching process, or, in the event that said peanuts shall have been previously roasted, to cool the same simultaneously with the blanching thereof.

In the accompanying drawings illustrating apparatus suitable for carrying out my said method, Figure —1— is a top plan view of a peanut blanching apparatus adapted for the carrying out of my said method. Fig. —2— is a fragmentary horizontal section of the same on the line 2—2 of Fig. —3—. Fig. —3— is a vertical transverse section of the same on the line 3—3 of Fig. —2—. Fig. —4— is an end elevation, partly in section, of another embodiment of peanut blanching apparatus adapted for the carrying out of the invention. Fig. —5— is a horizontal section of the same on the line 5—5 of Fig. —4—. Fig. —6— is a vertical transverse section on the line 6—6 of Fig. —5—. Fig. —7— is a detail view showing a nozzle in section.

In carrying out my method I employ preferably a foraminous drum 1 mounted on a shaft 2 and adapted to be slowly rotated, said drum being provided with a suitable opening 3 for the admission and removal of the peanuts to be blanched. The said drum 1 is preferably housed in a suitable casing 4 of larger diameter, which is supported upon the floor or other suitable support, and carries the bearings 5 for the shaft 2.

Extending longitudinally of the housing 4 and drum 1 and within said housing is a pipe 6 equipped with a plurality of discharge nozzles 7 which are adapted to direct compressed air into the drum 1 through the foraminous wall thereof and against the contained peanuts; said pipe being connected with the delivery end of a compressor 8 and being equipped between its ends with a coil 9 disposed within or upon suitable heating means for maintaining said coil hot so that air passing therethrough from the compressor 8, or other source of supply of compressed air, will be heated to a certain degree and delivered in the hot state into the housing 4 and drum 1 and against the kernels or peanuts to be blanched. The air delivered from the pipe 6 is preferably delivered at a pressure sufficient to impart a very high velocity thereto and the jets of said air are preferably very small and directed to the kernels disposed in close proximity thereto within the drum 1 said jets of air being adapted to break the membranes surrounding the peanuts and the heat being adapted when applied to the raw peanuts to loosen such membranes from the kernels and simultaneously roast the latter as well as blanch the same.

The number of the nozzles 7 and the exact disposition thereof may be changed and varied from what is illustrated in order to produce the desired result, and instead of one pipe 6 a greater number of the latter may obviously be employed. The suction end of the compressor 8 is also connected with the housing 4 by means of a pipe 10 which communicates with a shell 11 mounted upon the housing and which receives air from the latter through the screen or strainer 12 which serves to prevent the loosened peanut membranes from entering said pipe 10 for obvious reasons. By means of this arrangement the hot air delivered into the housing 4 is returned to the compressor 8 thus maintaining a more uniform temperature within said housing and economizing heat.

The apparatus shown in Figs. —1— to —3— inclusive, is particularly adapted for blanching raw peanuts, and for simultaneously roasting such raw peanuts. If my said method is to be applied to roasted peanuts then the apparatus shown in Figs. —4— to —6— inclusive, is preferably employed; this being substantially identical with the apparatus shown in Figs. —1— to —3— inclusive; except that air delivered from the compressor 13 through the pipe 14 and nozzles 15 into the housing 16 for the rotatable foraminous drum 17 is not heated during passage, but is delivered at ordinary temperature into the same. The peanuts are preferably delivered into the drum 17 directly from the roaster and while still hot, and the jets of compressed air delivered from the compressor 13 caused to impinge upon the kernels as the drum 17 is slowly rotated to blanch and at the same time cool said kernels so that the latter will be ready for market in their blanched condition in the least possible time after roasting thereof.

In the construction shown in Figs. —4— to —6— inclusive, the housing 16 is preferably connected with a suction fan by means of the pipe 18 so that the peanut membranes removed from the kernels will be drawn from the drum and delivered to any suitable container therefor.

In order that the minute or relatively minute jets of air or other fluid may impinge with sufficient force against the nuts to fracture the covering membranes thereof without projecting the nuts from their positions in which they are subjected to the action of said jets, the latter are applied at a sufficient level of the body of nuts contained in the drum as to cause said nuts subjected to said jets to be firmly held in place by the pressure of superposed nuts.

The openings in the discharge nozzles 7 are preferably of very small diameter, that is to say of a diameter considerably less than the smallest diameter of the nuts subjected to the action of the delivered jets.

While my invention is particularly intended and adapted to blanching peanuts, it may be successfully applied to blanching almonds and other nuts and my invention is therefore not to be construed to be limited to the blanching of any particular variety of nuts.

While the foregoing apparatus illustrated in Figs. —1— to —3— inclusive, and Figs. —4— to —6— inclusive, is suitable for the carrying out of my process, it will be obvious, of course, that the invention is not limited to this specific mode or manner of carrying out the same, but said method consist, independently of the particular construction of apparatus used, in removing the membranes from peanut kernels by means of compressed fluid projected against the same in such manner as will effectually remove, or break the membranes preparatory to removal thereof by the additional friction of the kernels against each other during travel thereof, which said travel is preferably imparted in such a manner as to cause said kernels to move relatively to the means for projecting air or fluid jets against the same and relatively to each other, and any apparatus which will be effective to bring the kernels and fluid jets in proper relation to each other to carry out the method as above described falls within the scope of the invention as defined in the appended claims.

I claim as my invention:

1. The herein described method of blanching nuts which consists in projecting membrane fracturing air jets against a mass of nuts.

2. The hereindescribed method of blanching nuts which consists in projecting membrane fracturing air jets against a mass of nuts, and moving the nuts during the application of the air jets to subject the several portions of the mass to the action of the jets.

3. The hereindescribed method of blanching nuts which consists in projecting membrane fracturing air jets against the under surface of a mass of nuts.

4. The hereindescribed method of blanching nuts which consists in projecting membrane fracturing air jets against the under surface of a mass of nuts and moving the nuts during such application to bring all of the individual nuts into position to be acted on by the air jets.

5. The hereindescribed method of blanching nuts which consists in projecting membrane fracturing jets of hot air against a mass of nuts.

6. The hereindescribed method of blanching nuts which consists in projecting air jets of relatively small area and at relatively high velocity against a mass of nuts and simultaneously therewith causing the mass of nuts to move relatively to the air jets to change the points of attack of said jets.

7. The hereindescribed method of blanching nuts which consists in projecting membrane fracturing jets of hot air against the under surface of a mass of nuts and during such application moving the nuts to cause the several individual nuts in the mass to be presented to the action of the hot air jets.

8. The hereindescribed method of blanching nuts which consists in projecting jets of heated air of relatively small area, and at relatively high velocity against a mass of nuts and simultaneously therewith, causing a relative movement of the individual nuts composing the mass to change the points of application of said jets.

In testimony whereof I have signed my name in presence of two subscribing witnesses.

FELIX SALOMON.

Witnesses:
R. W. LOTZ,
M. M. BOYLE.